United States Patent

Dinger

[15] 3,697,844
[45] Oct. 10, 1972

[54] FULL WAVE DC MOTOR CONTROL

[72] Inventor: Edward H. Dinger, Waynesboro, Va.

[73] Assignee: General Electric Company

[22] Filed: July 28, 1970

[21] Appl. No.: 58,773

[52] U.S. Cl. .................................. 318/331, 318/308
[51] Int. Cl. ........................... H02p 5/06, H02p 7/00
[58] Field of Search ............... 318/331, 345, 332, 308

[56] References Cited

UNITED STATES PATENTS

| | | |
|---|---|---|
| 3,475,672 | 10/1969 | Oltendorf .................. 318/308 |
| 3,239,742 | 3/1966 | Mierendorf et al. ........ 318/331 |
| 3,440,511 | 4/1969 | Igarashi et al. ............ 318/331 X |

Primary Examiner—J. D. Miller
Assistant Examiner—Robert J. Hickey
Attorney—Michael Masnik, Frank L. Neuhauser, Oscar B. Waddell and Joseph B. Forman

[57] ABSTRACT

A motor control circuit for use with a direct current motor. The control circuit includes means for generating and comparing a signal representative of the actual speed of the motor and a reference signal which has a component thereof indicative of the IR voltage of the armature and which further takes into account the field weakening effect of direct current motors to provide complete IR compensation over the entire range of motor speeds.

8 Claims, 2 Drawing Figures

INVENTOR.
EDWARD H. DINGER
BY Michael Masnik
HIS ATTORNEY

INVENTOR.
EDWARD H. DINGER
BY Michael Masnik
HIS ATTORNEY

FULL WAVE DC MOTOR CONTROL

BACKGROUND OF THE INVENTION

The present invention relates to a new and improved motor control, and more particularly to a full wave motor control for use with a direct current motor.

In a full wave direct current motor control circuit, it is desirable to obtain a feedback signal which is representative only of the back EMF of the armature as it rotates. However, the only voltage that can be sensed is the terminal voltage, which includes both the back EMF of the armature as well as the armature voltage drop. Many circuits have been devised to compare the terminal voltage of the motor with a reference signal having a component representative of the voltage drop across the armature, and to obtain a difference signal representative solely of back EMF of the motor as it rotates.

The general system just described is commonly known as IR voltage drop compensation. However, in any direct current motor, the amount of voltage compensation needed to exactly counteract the voltage drop across the armature decreases as the speed of the motor is increased. This occurs because as the armature current increases, it tends to weaken the field flux created in the field coil, and thus increases the speed of the motor. Thus as the speed of the motor increases due to this field weakening effect, the amount of IR voltage compensation needed to exactly counteract the armature voltage drop decreases. In the presently known motor control circuits, which utilize IR voltage drop compensation, one or several potentiometers must be reset when the motor speed is varied to obtain complete IR compensation for each particular speed of the motor. The present invention overcomes this problem by utilizing a control circuit wherein the initial setting of certain components of the circuit provide either complete compensation, overcompensation, or undercompensation, of the armature voltage over the entire range of speeds of any given motor.

SUMMARY OF THE INVENTION

Accordingly, it is an object of the present invention to provide a direct current motor control circuit which automatically compensates for the voltage drop across the armature over the entire range of speeds of any given motor.

It is a further object of the present invention to provide a direct current motor control circuit which may be utilized with a wide variety of direct current motors.

Briefly stated, in accordance with one aspect of the invention, there is provided a direct current motor control for a direct current motor having an armature and a field coil energizable from an alternating current or AC source. The motor control circuitry comprises input means for connecting said control circuitry to an AC source to activate means for providing periods of conductivity of current through the armature. The control circuitry further includes means for providing a signal representative of the motor speed and means for providing a reference signal. The reference signal includes automatic voltage compensating means for substantially counteracting the armature voltage drop over the entire range of motor speeds. Means is provided for comparing the signal representative of the motor speed and the reference signal to provide an error signal representative of the difference therebetween, while means for modifying periods of conductivity of current through the armature vary those periods of conductivity in response to the error signal transmitted thereto.

BRIEF DESCRIPTION OF THE DRAWINGS

While the specification concludes with claims particularly pointing out and distinctly claiming the subject matter which is regarded as the invention, it is believed that the invention will be better understood from the following description, taken in connection with the accompanying drawings in which:

DETAILED DESCRIPTION OF THE PREFERRED EMBODIMENT

Figure 1:
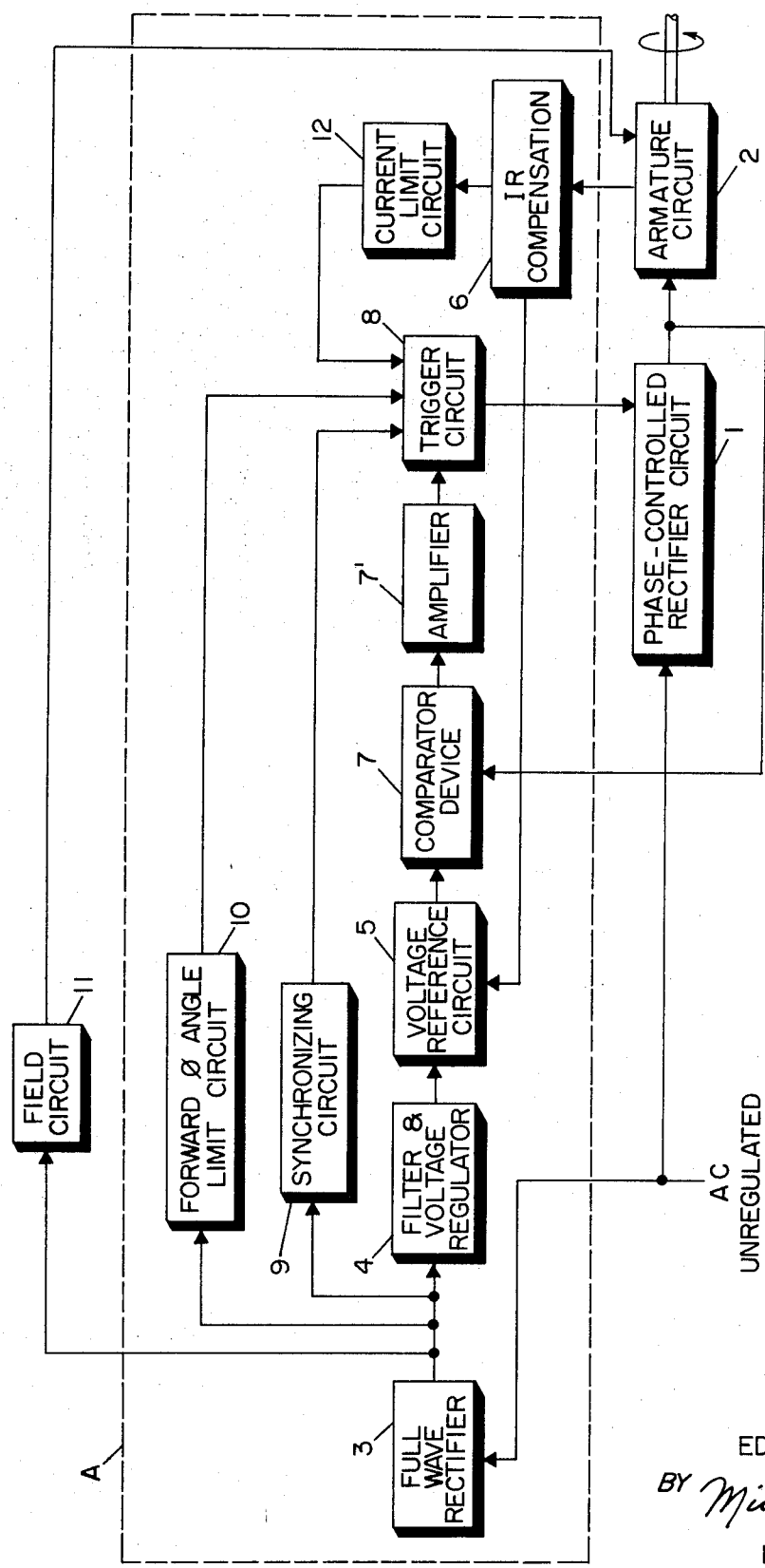
FIG. 1 is a block diagram of one embodiment of the invention.

Referring to the drawings and more particularly to FIG. 1, an unregulated alternating current input voltage is fed into a first phase-controlled rectifier bridge 1 to obtain a phase-controlled and adjustable voltage to regulate the speed of the motor armature circuit 2. The unregulated AC input voltage is also fed into a second full wave rectifier 3 and therefrom into a filter and voltage regulator 4. The output of the filter and voltage regulator provides one input to a voltage reference circuit 5. A second input to the voltage reference circuit 5 is obtained from the IR voltage compensation circuit 6, which provides a signal representative of the IR voltage drop within the armature circuit. The output of the voltage reference circuit 5 is compared with the output of the phase-controlled bridge rectifier 1 in a comparator 7 and the difference therebetween is fed into an amplifier circuit 7'. The amplified signal is fed to the trigger circuit 8 to regulate the phase-controlled, adjustable voltage from the output of the phase-controlled bridge rectifier 1. The output of the second full wave rectifier 3 is fed through a synchronizing circuit 9 into the trigger circuit 8, through a forward phase angle limiting circuit 10 into the trigger circuit, and through a field coil circuit 11, where applicable. A current limiting circuit 12 monitors the output of the IR compensation circuit 6 to regulate the operation of the trigger circuit 8.

Figure 2:
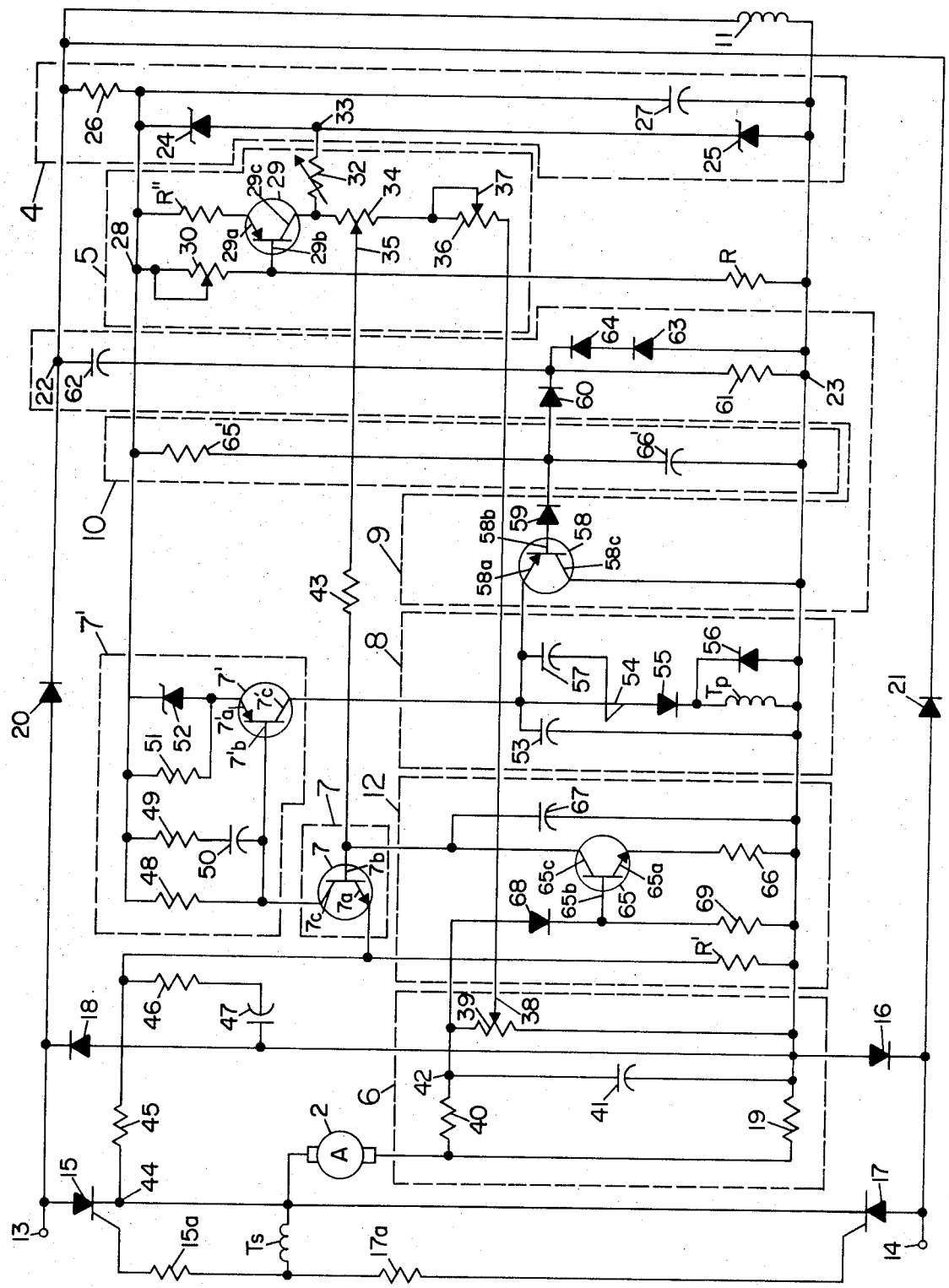
FIG. 2 is a circuit diagram of one embodiment of the direct current motor control circuit of the invention.

In one embodiment of the invention, as is best shown in FIG. 2, provision is made for connecting the motor control circuitry to a line by means of terminals 13 and 14. These terminals are connected to and provide power to the phase-controlled rectifier bridge 1 consisting of a first silicon controlled rectifier 15 and a first diode 16, and a second silicon controlled rectifier 17, and a second diode 18. The gates of the SCRs are interconnected through appropriate resistors 15a and 17a to the secondary $T_s$ of a pulse transformer T. The phase-controlled, adjustable voltage obtained at the output of the phase-controlled rectifier bridge is applied to the motor armature circuit 2 and a series connected resistor 19, whose purpose will hereinafter be more fully discussed.

The motor control circuit A includes a second bridge rectifier circuit 3 which utilizes a first diode 20 and a second diode 21 as well as previously mentioned diodes 16 and 18 of the phase controlled bridge rectifier, and which is connected between terminals 22 and 23. When applicable, the field coil 11 of the DC motor is also connected between terminals 22 and 23. The voltage output from the second bridge rectifier is regulated and filtered by means of a pair of zener diodes 24 and 25 in series with a resistor 26, all of which are connected between terminals 22 and 23, and a capacitor 27, which is connected in parallel with zener diode 24 and 25. A regulated voltage is obtained between terminals 23 and 28, which are connected at the non-common terminals of zener diodes 24 and 25.

A reference voltage circuit 5 is disposed between terminals 23 and 28 and includes a transistor 29 having an emitter 29a, a base 29b, and a collector 29c. A maximum speed potentiometer 30 having an adjustable arm 31 associated therewith is connected between the base 29b of transistor 29 and terminal 28 to provide a constant current in the reference voltage circuit. The base 29b of transistor 29 is also connected through resistor R to point 23. A variable resistor 32 is connected between the collector 29c of transistor 29 and point 33, which is common to zener diodes 24 and 25. The collector 29c of transistor 29 is also connected in series with speed adjusting potentiometer 34, having an adjustable arm 35, and with a minimum speed potentiometer 36, which also has an adjustable arm 37. The emitter 29a is connected through resistor R" to point 28.

The bottom of the minimum speed potentiometer 36 is connected to the arm 38 associated with the IR compensation potentiometer 39 of the IR compensation circuit 6. The IR voltage compensation circuit further includes filtering components, resistor 40 and capacitor 41, which are connected on each side of resistor 19 between points 42 and 23. The IR compensation potentiometer 39 is also connected between points 42 and 23.

The arm 35 of the speed potentiometer 34 is connected through a resistor 43 to the base 7b of comparison transistor 7, which also has an emitter 7a and a collector 7c. The reference signal including the constant portion from the reference voltage circuit 5, and the portion representative of the armature voltage drop from IR compensation circuit 6 are transmitted through resistor 43 to the base 7b of the comparator transistor 7. From point 44 a voltage representative of the terminal voltage of the armature is fed through resistor 45 to the emitter 7a of comparator 7. The series combination of a resistor 46 and a capacitor 47 are connected at one end to the emitter 7a of the comparator and at the other end between diodes 16 and 18. The output of the comparator, measured at the collector 7c, is representative only of the back EMF of the armature. The emitter 7a is also connected through resistor R' to point 23. The collector 7c of comparator transistor 7 is connected to the base 7b of the amplifier transistor 7'; which also has an emitter 7'a and a collector 7'c. Connected between the base 7'b of amplifier transistor 7' and point 28 is the parallel combination of resistor 48 and series-connected resistor 49 and capacitor 50. Connected between the emitter 7'a and point 28 is the parallel combination of resistor 51 and zener diode 52.

The collector 7'c of the amplifying transistor 7' is connected to the trigger circuit 8. The trigger circuit includes charging capacitor 53, series-connected unilateral switch 54, diode 55, and the primary $T_p$ of pulse transformer T, all of which are connected between the collector 7'c of the amplifier transistor 7' and point 23. A diode 56 is connected in parallel with the primary of the pulse transformer while a capacitor 57 is connected in parallel with the unilateral switch 54.

The circuit 9 for synchronizing the charging of the capacitor 53 with the beginning of the half cycle of the rectified AC voltage is connected between points 22 and 23. The circuit includes a transistor 58, having an emitter 58a, base 58b, and a collector 58c, and which has its emitter-collector terminals connected in parallel with charging capacitor 53. The base terminal is connected through series connected diodes 59 and 60 to a point between resistor 61 and capacitor 62. Clamping diodes 63 and 64 are connected in parallel with resistor 61.

The circuit 10 for preventing the firing of the trigger circuit until a minimum number of degrees after the zero voltage point of the rectified AC input voltage is connected between points 23 and 28 and includes resistor 65' and capacitor 66'. The point common to the resistor 65' and the capacitor 66' is tied to the point common to diodes 59 and 60 of the synchronizing circuit.

The circuit 12 for preventing current, above a predetermined amount, from flowing through the armature includes transistor 65 having emitter 65a, base 65b, and collector 65c. The collector-emitter terminals are connected between the base 7b of transistor 7 and a resistor 66 to point 23. Capacitor 67 is connected across the collector-emitter terminal 65c and point 23, while a signal representative of the amount of current in the armature is received at the base 65b of transistor 65 through diode 68. The base 65b is also connected through resistor 69 to point 23.

A detailed explanation of the operation of the control circuit follows.

Before the direct current motor is energized for operation, potentiometer 30 is set to a value so that the voltage between the collector 29c of transistor 29 and point 28 approximately equals the voltage across zener diode 24. Potentiometer 36 is set to a value so that the entire range of speeds of a particular motor from a minimum speed, may be obtained by adjustment of the arm 35 of potentiometer 34. The motor is then driven at a very low speed (approximately 5 to 10 percent of rated speed) and arm 38 of potentiometer 39 is set so that the no load low speed of the motor equals the full load low speed of the motor. The motor is driven at its rated speed by suitable adjustment of potentiometer 34 and the variable resistor 32 is adjusted until the no load rated speed of the motor equals the full load speed of the motor. The impedance from the collector 29c of transistor 29 toward point 28 is substantially the parallel combination of the emitter-collector resistance of transistor 29, and variable resistor 32, and the resistance value across the emitter and collector terminals is much larger than that of variable resistor 32. Thus adjustment of the variable resistor 32 will regulate the proportion of IR voltage compensation transmitted from the IR compensation circuit 6 through the arm 35 of potentiometer 34 and into the base 7b of comparator transistor 7 to compensate for the field weakening effect over the entire range of speeds of the particular motor in use. In this way, the IR voltage drop is completely counteracted over the entire range of motor speeds because the field weakening effect has been taken into account. While the example utilized complete IR voltage compensation, it will be obvious to those skilled in the art that undercompensation or overcompensation could have been just as easily achieved without departing from the true spirit and scope of the invention.

Once the initial settings have been made, the motor is ready for operation. An unregulated AC input voltage is applied through terminals 13 and 14 and full wave rectified through SCRs 15 and 17 and diodes 16 and 18. The periods of conductivity of current through the SCRs and diodes into armature circuit 2 determine the speed of the motor.

The control circuit is utilized to regulate the periods of conductivity of current through the armature by regulating the time during each half cycle of the input AC voltage when one or the other of the SCRs will be gated properly to allow conductivity therethrough. This regulation occurs as follows. The input AC voltage is full wave rectified by diodes 16, 18, 20, and 21 and transmitted through filtering circuit 26 and 27 and the voltage regulating zener diodes 24 and 25 to provide a constant reference voltage output from transistor 29 through a portion of potentiometer 34, and into the base 7b of the comparator transistor 7. The voltage across the armature current sensing resistor 19 is also monitored and a signal, which is representative of the armature current, is filtered by resistor 40 and capacitor 41 and directed through a portion of IR compensation potentiometer 39 and arm 38, through a portion of the minimum speed potentiometer 36 and arm 37, and through a portion of the speed potentiometer 34 and arm 35 into the base 7b of the comparator transistor 7. The reference signal, which comprises the constant voltage input portion from voltage reference circuit 5 as well as a variable signal representative of the armature current, is compared with a signal obtained from point 44, which is representative of the terminal voltage of the armature, and which is applied to the emitter 7a of comparator transistor 7. The comparator transistor subtracts out the two components having portions proportional to the IR voltage drop so that the signal generated in the collector 7c is a function of the back EMF of the armature as it rotates. This signal is transmitted to the base 7'b of transistor 7', where it is amplified, and fed into the trigger circuit 8 to commence the charging of the firing capacitor 53. Once the charging capacitor 53 reaches the trigger level of the unilateral switch 54, the switch conducts to transmit a pulse to the primary $T_p$ of pulse transformer T, and into the secondary $T_s$ of the pulse transformer. This pulse gates the proper one or the other of the silicon controlled rectifiers 15 or 17 to allow it to conduct. The time during each half cycle of input voltage at which one or the other of the SCRs 15 or 17 fires, determines the duration of the period of conductivity of current through the armature and hence the motor speed.

At the end of each half cycle of applied AC input voltage, the point between diodes 59 and 60 goes negative because of the decreasing voltage thereof and the charge on capacitor 62, and is clamped at one diode negative so that transistor 58 conducts. When transistor 58 is conducting, the charging capacitor 53 discharges through the transistor 58 to insure that the unilateral switch 54 is turned off and the commencement of the charging of capacitor 53 is synchronized with the zero crossing point of the rectified AC input voltage.

If capacitor 53 is charged at a rate faster than the charging rate of capacitor 66', transistor 58 will turn on to limit the maximum charging rate of capacitor 53 to that of capacitor 66. By providing a maximum charging rate for capacitor 53, the actuation of the trigger circuit is delayed a prescribed minimum number of electrical degrees after the zero crossing point of the rectified AC input voltage.

If an abnormal current appears in the armature circuit, it will be reflected by the voltage across the armature current sensing resistor 19. An excessive voltage will cause a signal to be transmitted to the base 65b of transistor 65 to turn it on. When this occurs, current is diverted from the base 7b of transistor 7 to ultimately regulate the firing of the SCRs. If the abnormal voltage is sufficiently large, transistor 65 will become strongly conductive and turn off comparator transistor 7 until the excessive current within the armature has been removed.

Thus the present invention accounts for the field weakening effect inherent in all DC motors to enable complete IR voltage drop compensation over the entire range of speeds of the particular motor in use.

While the invention is described with particular reference to the construction shown in the drawings, it is understood that further modification may be made without departing from the true spirit and scope of the invention, which is defined by the claims appended hereto.

What is claimed as new and desired to be secured by Letters Patent of the United States is:

1. A control for a motor having an armature comprising means for energizing the armature of said motor from an alternating voltage source by means controlling the periods of conductivity of a current from said source through said armature, means for providing a reference voltage which is adjustable to an initial value proportional to a desired motor speed, means for sensing and providing a speed voltage representative of the instantaneous speed of said armature, means for comparing said sensed speed voltage and said reference voltage to provide a control signal, means to modify the speed of the motor in accordance with said control signal, and means to provide compensation for the differing effect of armature IR voltage drop at differing motor speeds comprising means for modifying said reference voltage from said initial value to a final value as a function of both said armature current and said initial adjusted value of said reference voltage.

2. Apparatus according to claim 1 wherein said means for providing an adjustable reference voltage comprises a voltage divider whose setting determines the adjustment value.

3. Apparatus according to claim 2 wherein said means for providing an adjustable reference voltage comprises a potentiometer connected across a source of constant, unidirectional voltage through a circuit providing a voltage signal proportional to armature current and means for applying the signal developed at the movable tap of said potentiometer to said comparing means.

4. Apparatus as defined in claim 1 and further including means to synchronize the activation of said means for modifying the periods of conductivity of current through such armature with a zero voltage point of such alternating voltage source.

5. Apparatus as defined in claim 4 and further including means to delay the activation of said means for modifying the periods of conductivity of current through such armature for a predetermined number of electrical degrees after said zero voltage crossing point of such alternating voltage source.

6. Apparatus as defined in claim 5 and including means for limiting the current flow through such armature and interrupting said current flow upon said current flow exceeding a predetermined value.

7. Apparatus as defined in claim 6 and wherein said means for comparing the sensed speed voltage and the reference signal is a transistor having an emitter, a base and a collector, said speed voltage being applied to the emitter of said transistor, said reference voltage being applied to the base of said transistor and the control signal appearing at said collector.

8. Apparatus as defined in claim 7 and wherein said means for controlling the periods of conductivity of current through such armature includes a controlled rectifier.

* * * * *